(12) United States Patent
Austin et al.

(10) Patent No.: US 6,615,220 B1
(45) Date of Patent: Sep. 2, 2003

(54) METHOD AND MECHANISM FOR DATA CONSOLIDATION

(75) Inventors: Dawn Austin, Lakewood, CO (US); Kenton E. Noble, San Mateo, CA (US); Richard J. Lotero, San Mateo, CA (US); Subash Chadalavada, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/524,628

(22) Filed: Mar. 14, 2000

(51) Int. Cl.[7] .............................................. G06F 17/30

(52) U.S. Cl. .................................................. 707/104.1

(58) Field of Search ........................ 707/3, 513, 104.1; 705/1, 42, 67; 709/202; 435/6

(56) References Cited

U.S. PATENT DOCUMENTS

| | | | | | |
|---|---|---|---|---|---|
| 5,278,978 | A | * | 1/1994 | Demers et al. | 707/101 |
| 5,838,965 | A | * | 11/1998 | Kavanagh et al. | 707/103 R |
| 6,151,608 | A | * | 11/2000 | Abrams | 707/204 |
| 6,324,498 | B1 | * | 11/2001 | Wajda | 703/25 |
| 6,523,172 | B1 | * | 2/2003 | Martinez-Guerra et al. | 717/143 |

* cited by examiner

Primary Examiner—Safet Metjahic
Assistant Examiner—Sana Al-hashemi
(74) Attorney, Agent, or Firm—Bingham McCutchen LLP

(57) ABSTRACT

The present invention is directed to a method and mechanism for consolidating data. According to an embodiment of the invention, consolidation is performed based upon transformation rules established for data to be consolidated. An aspect of an embodiment of the invention relates to performing data transformations to resolve potential consolidation conflict issues. Another aspect of an embodiment of the invention relates to validation procedures performed after transformation.

68 Claims, 17 Drawing Sheets

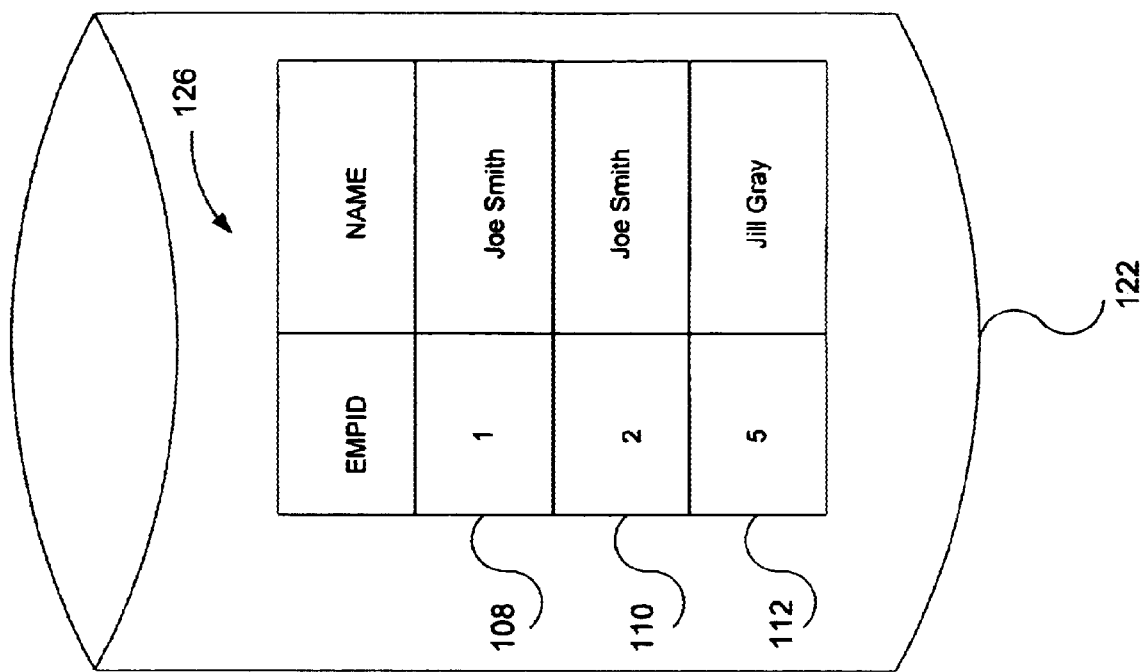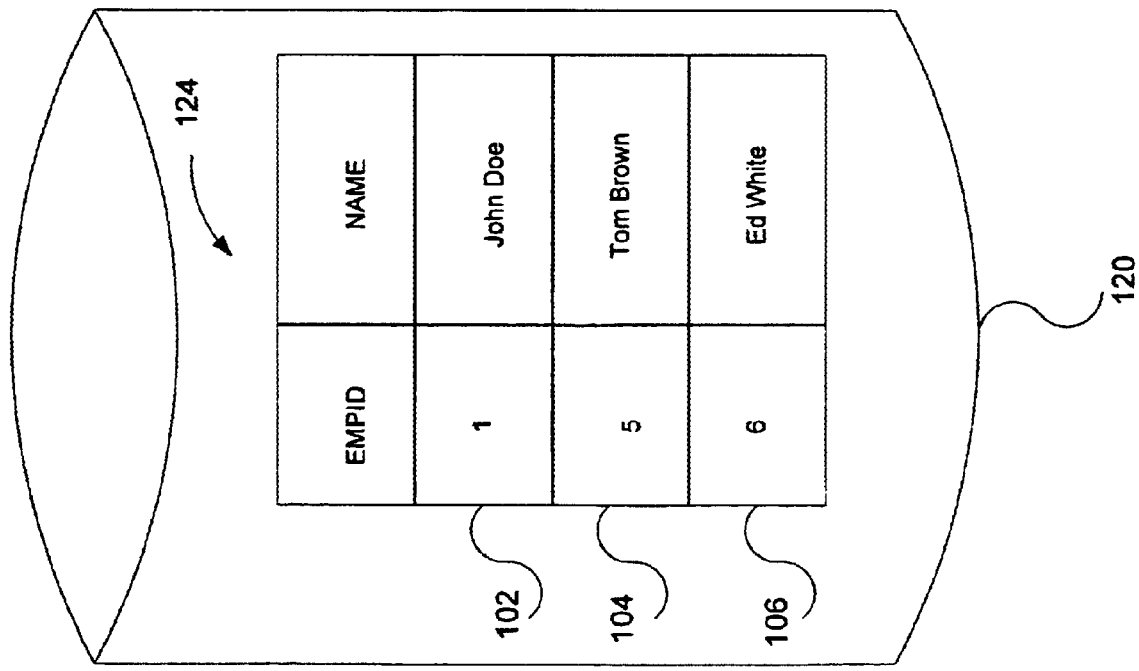
FIG. 1

| EMPID | NAME |
|---|---|
| 1 | John Doe |
| 5 | Tom Brown |
| 6 | Ed White |
| 1001 | Joe Smith |
| 1002 | Joe Smith |
| 1005 | Jill Gray |

Exhibit 3-1 Base Rules

BASE TRANSFORMATION RULES

| Schema | Table | Column | Rule Type | Rule |
|---|---|---|---|---|
| AP | AP_1096_DATA_ALL | ORG_ID | ORG_ID | |
| AP | AP_1096_DATA_ALL | TAX_ENTITY_ID | SEQ | |
| AP | AP_1099_TYPES | FORM_TYPE_NAME | PREFIX | |
| AP | AP_AGING_PERIODS | AGING_PERIOD_ID | SEQ | |
| AP | AP_AGING_PERIOD_LINES | AGING_PERIOD_ID | SEQ | |
| AP | AP_AGING_PERIOD_LINES | AGING_PERIOD_LINE_ID | SEQ | |
| AP | AP_AWT_BUCKETS_ALL | ORG_ID | ORG_ID | |
| AP | AP_AWT_BUCKETS_ALL | PERIOD_NAME | PREFIX | |
| AP | AP_AWT_BUCKETS_ALL | TAX_NAME | PREFIX | |
| AP | AP_AWT_BUCKETS_ALL | VENDOR_ID | SEQ | |

<< < > >>    Query   Save   Exit

Client Reference | Client Rules | Set Rules | Client Tables | Seed Tables

FIG. 7

Exhibit 3-2 Client Rules

CLIENT TRANSFORMATION RULES — Main

| Schema | Table | Column | Rule Type | Rule |
|---|---|---|---|---|
| AR2 | AR_ACTION_NOTIFICATIONS | ACTION_NOTIFICATION_ID | SEQ | 22000000 |
| AR2 | AR_ACTION_NOTIFICATIONS | CALL_ACTION_ID | SEQ | 22000000 |
| AR2 | AR_ADJUSTMENTS_ALL | ORG_ID | ORG_ID | 22 |
| AR2 | AR_ADJUSTMENTS_ALL | CHARGEBACK_CUSTOMER_TRX | SEQ | 22000000 |
| AR2 | AR_ADJUSTMENTS_ALL | ADJUSTMENT_ID | SEQ | 22000000 |
| AR2 | AR_ADJUSTMENTS_ALL | SUBSEQUENT_TRX_ID | SEQ | 22000000 |
| AR2 | AR_ADJUSTMENTS_ALL | ADJUSTMENT_NUMBER | SEQ | 22000000 |
| AR2 | AR_ADJUSTMENTS_ALL | ASSOCIATED_CASH_RECEIPT_I | SEQ | 22000000 |
| AR2 | AR_ADJUSTMENTS_ALL | CUSTOMER_TRX_ID | SEQ | 22000000 |
| AR2 | AR_ADJUSTMENTS_ALL | DISTRIBUTION_SET_ID | SEQ | 22000000 |

[<<] [>>]   [Query] [Save] [Exit]

[Client Reference] [Base Rules] [Set Rules] [Client Tables] [Seed Tables]

METHOD AND MECHANISM FOR DATA CONSOLIDATION

BACKGROUND OF THE INVENTION

1. Field of the Invention

The invention relates to computer systems, and more particularly, to a method and mechanism for consolidating data.

2. Background

Many companies that utilize database systems face the issue of data fragmentation in their database application environments. Fragmentation may occur because of separate installations of the same database products. This data fragmentation presents difficulties for a company that needs to access its data for business intelligence to make global strategic decisions.

For example, as businesses evolve and grow across geographic and logistical boundaries, each new business location may implement its own local database system to 1) support unique business requirements, 2) minimize WAN (wide area network) connectivity costs, or 3) address character set constraints. Because such installations of localized database systems are often driven by immediate needs rather than coordinated efforts, the overall set of data maintained by the company may become fragmented. The greater the number of locations at which separate data is maintained, the greater the possible fragmentation problems with respect to the company's data.

Additionally, data maintained by a company can become fragmented if the data is physically partitioned in multiple product installations in the same database. Such partitioning may occur, for example, using the Multiple Sets of Books Architecture (MSOBA) as utilized by Oracle Applications.

SUMMARY OF THE INVENTION

The present invention is directed to a method and mechanism for consolidating data. According to an embodiment of the invention, consolidation is performed based upon transformation rules established for data to be consolidated. An aspect of an embodiment of the invention relates to performing data transformations to resolve potential consolidation conflict issues. Another aspect of an embodiment of the invention relates to validation procedures performed after transformation.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 1 depicts examples of database tables to be consolidated.

FIG. 2 illustrates a consolidated database table according to an embodiment of the invention.

FIG. 7 depicts an example of a base rules table according to an embodiment of the invention.

FIGS. 8A and 8B depicts examples of client rules tables according to an embodiment of the invention.

FIG. 9 depicts an example of the transformation approach applied to seed tables according to an embodiment of the invention.

DETAILED DESCRIPTION

Figure 3:
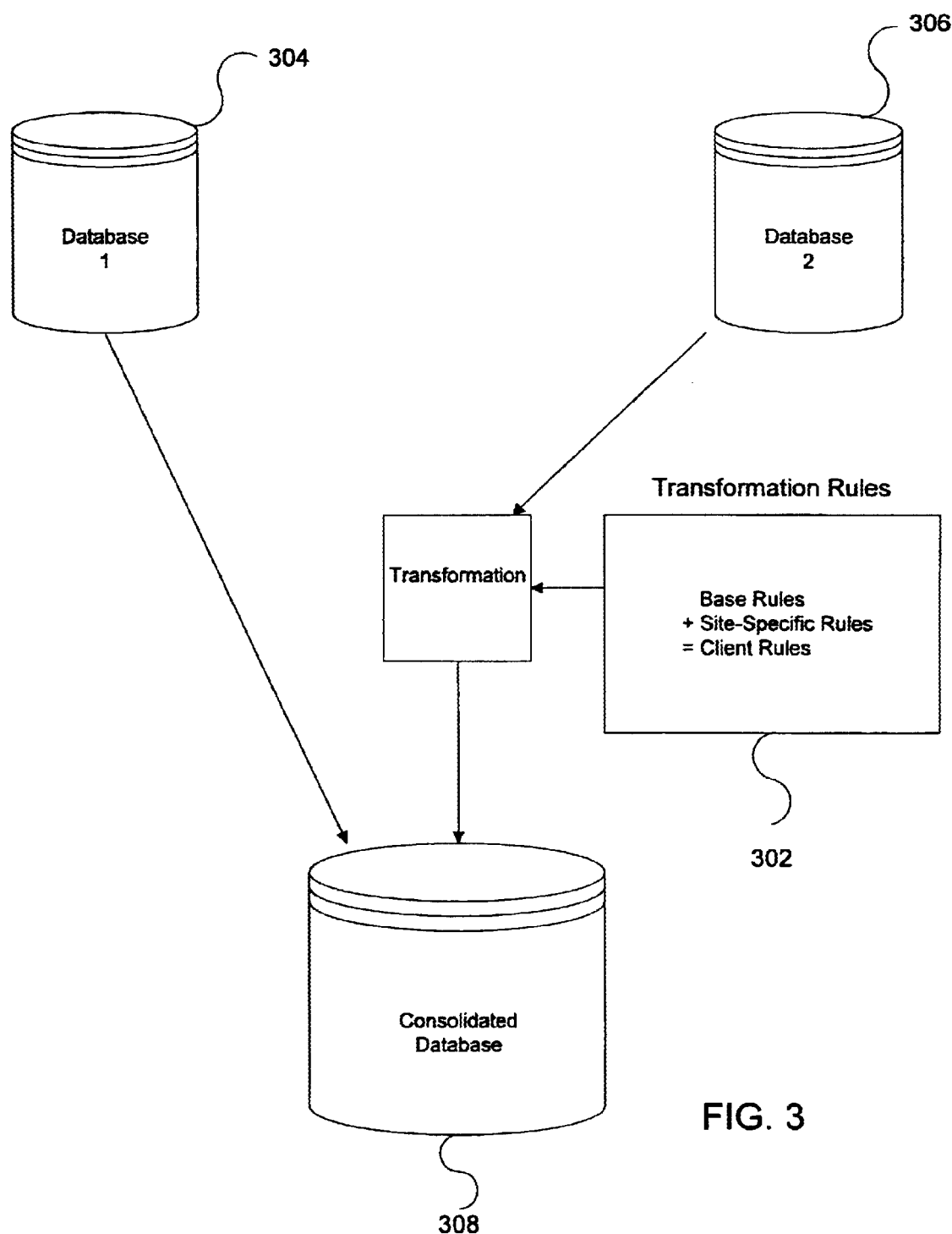
FIG. 3 illustrates a consolidation architecture according to an embodiment of the invention.

The present invention is directed to a method and mechanism for consolidating data. In the following description, for the purposes of explanation, one or more embodiments having specific combinations of elements and/or process actions are set forth in order to provide a thorough understanding of the present invention. It will be apparent, however, to one skilled in the art that the present invention may be practiced without these specific combinations or order of elements/process actions.

An aspect of the invention relates to successfully preserving data integrity and uniqueness when consolidating data. Some operations that are performed during the data consolidation using an embodiment of the invention include: (1) analysis of data models and data sets of source and target environments; (2) transformation of the source data set; and, (3) merge data sets. According to an embodiment of the invention, consolidation is performed based upon "transformation rules" established for the data to be consolidated. Transformation rules set forth the type of transformation and transformation parameters that are used to transform source data such that data value conflicts are avoided when the data sets are consolidated. The transformation rules include a base set of rules which can be customized and extended based upon the actual configuration of the database(s) to be consolidated. The present invention provides a mechanism to record the data transformation process and the data merge process thus providing an auditable account of the transformation and the merge.

To illustrate this aspect of the invention, consider the database tables shown in FIG. 1. For purposes of this example, assume databases 120 and 122 are separate installations or instances of the same database application product. Although in different databases, tables 124 and 126 represent the same/equivalent database tables used by their respective database application products. Both table 124 in database 120 and table 126 in database 122 include the same two columns ("EMPID" and "NAME" columns). Assume that it is desired to consolidate the two database tables.

For table 124 and 126, also assume that the EMPID values are primary keys, which by definition must be unique values.

Unique keys, such as EMPID primary keys, are commonly used in database tables to prevent the same data from being entered twice. Thus, the EMPID primary key ensures that employees with identical record information (e.g., names) are uniquely identified by other criteria. An initial observation of the two tables reveals that several rows in table 124 of database 120 contain EMPID values that are identical to EMPID values for rows in table 126 of database 122. For example, row 102 of table 124 and row 108 of table 126 both show an employee with an EMPID of "1" despite their association with different employee names. Similarly, row 104 of table 124 has the same EMPID value as row 112 of table 126. Consolidating the data from tables 124 and 126 cannot be accomplished by simply combining the two tables into a single table, since primary keys would be duplicated and unique constraints violated.

As stated above, the present invention associates one or more transformation rules with data to be consolidated. The transformation rule identifies the type of transformation and transformation value that must be applied to a particular table/column to guarantee the uniqueness of data in that table/column. This transformation is applied before merging data from one or more sources.

If the column type to be transformed is a numerical sequence, a transformation rule for "Sequence" can be defined to add a specific numeric value to every column value. With reference to FIG. 1, a transformation rule can be associated and applied to the EMPID column of table 126 such that after the transformation, no overlap exists between the EMPID values for tables 124 and 126. For example, a user-defined value of 1000 can be added to each existing EMPID value in table 126 according to a Sequence transformation rule. Thus, the EMPID value of row 108 in table 126 is transformed from "1" to "1001". Similarly, the EMPID value of row 110 is transformed from "2" to "1002" and the EMPID value of row 112 from "5" to "1005". This transformation rule would be appropriate if the known EMPID values in table 124 are between the numbers 0–999. Once the transformation rule is applied to table 126, there would no longer be any overlapping EMPID numbers between tables 124 and 126. At this point, the contents of transformed table 126 can be merged with the contents of table 124 without causing any primary key conflicts. The successfully merged table from the contents of table 124 and transformed table 126 is shown in FIG. 2. Note that a similar result could have been reached by transforming just table 124 and not table 126, or by transforming both tables 124 and 126.

The following are examples of transformation rule types that can be assigned to each column requiring transformation:

(a) Sequence ("Seq") rule type—this rule type indicates that the column value needs to be incremented by a specified value (such as the example of FIGS. 1 and 2). This rule type typically applies to columns that derive their value from a sequence, either directly or indirectly, so as to maintain data integrity (Ex:column A1 of table A derives the value from sequence S1 and column B1 of table B derives the value from column A1 of table A through primary key-foreign key relationship. In this case, column B1 of table B derives the value indirectly from the sequence). This rule type allows data to be more easily converted from the physical partitioning required by Multiple Sets Of Books Architecture into the logical partitioning utilized by the Multiple Organization architecture (these architecture types are explained further in the Illustrated Example section). For the columns that derive values directly from the sequence, the reference table and reference column are same as the table name and column name.

(b) Prefix rule type—this rule type applies to varchar or character/string columns that are either unique by themselves (through a unique index), or reference a unique column. As the name indicates, this rule type specifies that column values are prefixed with alpha/numeric character(s) to maintain the uniqueness of the column. Similar to the Sequence rule type, columns that have a unique index in the application database will have the same reference table and column as the table name and column name. Prefixing existing column values with a user-defined string or character value facilitates conducting queries using the prefixed values. For example, if a first set of data to be merged is located in France and a second set is located in the United States, then each value in table columns having this rule type could be transformed to prefix "France-" before data values merged from the France database, while "US-" is prefixed to data values from the US database. In this manner, there is no possibility of conflicting overlaps to unique constraints from either database having this rule type, and the resulting transformed data can be easily searched and sorted according to the origin of the data.

(c) Pre__C rule type—this rule type is a different flavor of the 'prefix' rule type applied to columns records that have reached the maximum column width. This rule removes a certain number of characters from the end of the record and inserts a corresponding number of characters at the beginning of the record.

(d) Org__id rule type—this rule type is used in an embodiment of the invention for migrating data to architectures that support multiple organizations. If the source databases do not use organization identification numbers (such as org__id column values used in the Multiple-Organization architecture), then this value can be defined using this rule type. For this rule type, reference table and reference column are preferably the same as the table name and column name.

FIG. 3 depicts an architecture for consolidating data according to an embodiment of the invention. According to this disclosed embodiment, a set of "base" rules are derived from the standard data model of each particular database application version involved in the consolidation. The set of base rules provides transformation rules for columns in the standard installation of these application versions. However, the base rules can be modified to address modifications or additions to the standard data model using site-specific rule changes. These site-specific rules changes are defined by the configuration of the specific databases to be consolidated. The combination of the base rules with any additions, changes, or removals of rules based upon the site-specific rule changes results in a unique set of "client" rules. Thus, the exact set of transformation rules that will be employed to merge databases 304 and 306 are the client rules. The client rules are utilized to transform any database elements that must be modified for consolidation into the consolidated database 308.

ILLUSTRATED EXAMPLE

Figure 6A:
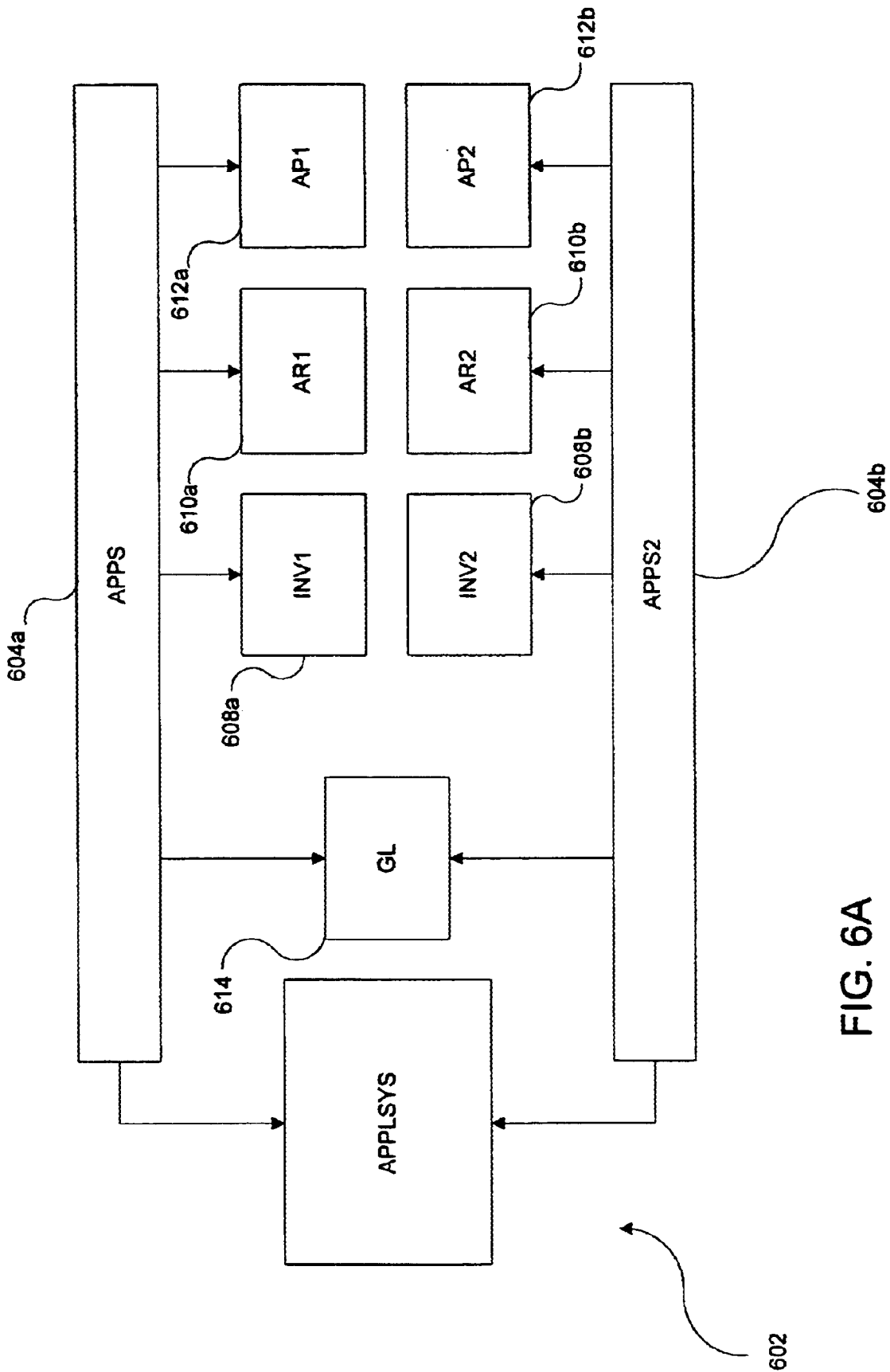
FIG. 6A depicts an example of a MSOB architecture.

FIG. 6A shows a database architecture referred to as the Multiple Sets of Books Architecture ("MSOB Architecture" or "MSOBA"). This type of architecture permits the installation of multiple product installation groups in a single database instance. Various reasons exist for utilizing the MSOB architecture. For example, older versions of some financial database applications often did not allow the concurrent use of multiple currencies. The MSOB architecture provides physical partitioning which allows concurrent use of multiple currencies.

FIG. 6A depicts a MSOBA database system 602 having two distinct product installation groups 604a and 604b. A product installation group is a set of installed application tables or schemas that implements a given set of "books". Product installation group 604a includes a database inventory product INV1 608a, while product installation group 604b includes a second installation of inventory product INV2 608b. Similarly, accounts receivable product AR1 610a and AR2 610b and accounts payable product AP1 612a and AP2 612b were installed in the two product installation groups 604a and 604b. Note that in the MSOB architecture, there are applications accessible to both schemas with a single installation (e.g., the GL application 614).

While the same application may be installed in multiple product installation groups, the way those applications are implemented and used may differ between product installation groups. This is because the business supported by the applications may have different requirements for accessing and storing its data. Thus, it is possible for product installation groups, particularly for geographically diverse businesses, to contain different database configurations.

Figure 6B:
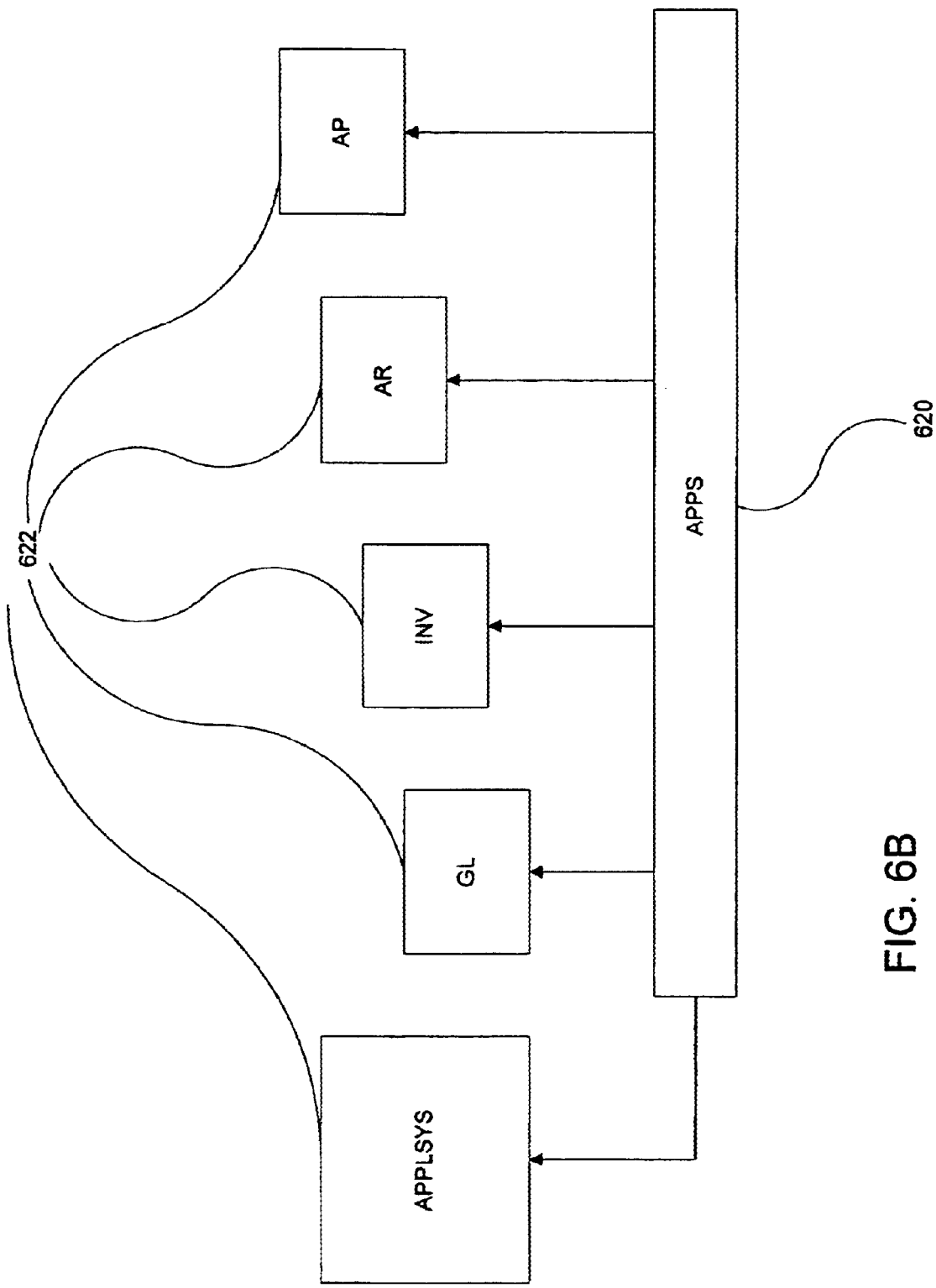
FIG. 6B depicts an example of a Multiple Organization (MO) architecture.

FIG. 6B depicts a database architecture having Multiple Organization ("MO") support, which provides logical data partitioning and inter-organization transaction functionality. In MO architectures, a single installation of application structures 622 allows, among other things, the concurrent use of multiple currencies within a single product installation group. Example of database products that include MO support includes Oracle Applications releases version 10.7 and above.

The present invention can be utilized to migrate MSOBA data that has been fragmented into multiple product installation groups into a single MO product installation group. Migrating from MSOBA to MO using the present embodiment of the invention involves transforming data which was once unique by virtue of being in its own product installation group and merging data without changing the data model. When migrating Oracle MSOBA application data to the MO architecture, all existing non-primary existing product installation groups are merged into a single primary product installation group. For example, with reference to FIG. 6A, INV2, AR2, and AP2 data can be merged into INV1, AR1, and AP1, respectfully.

Figure 4:
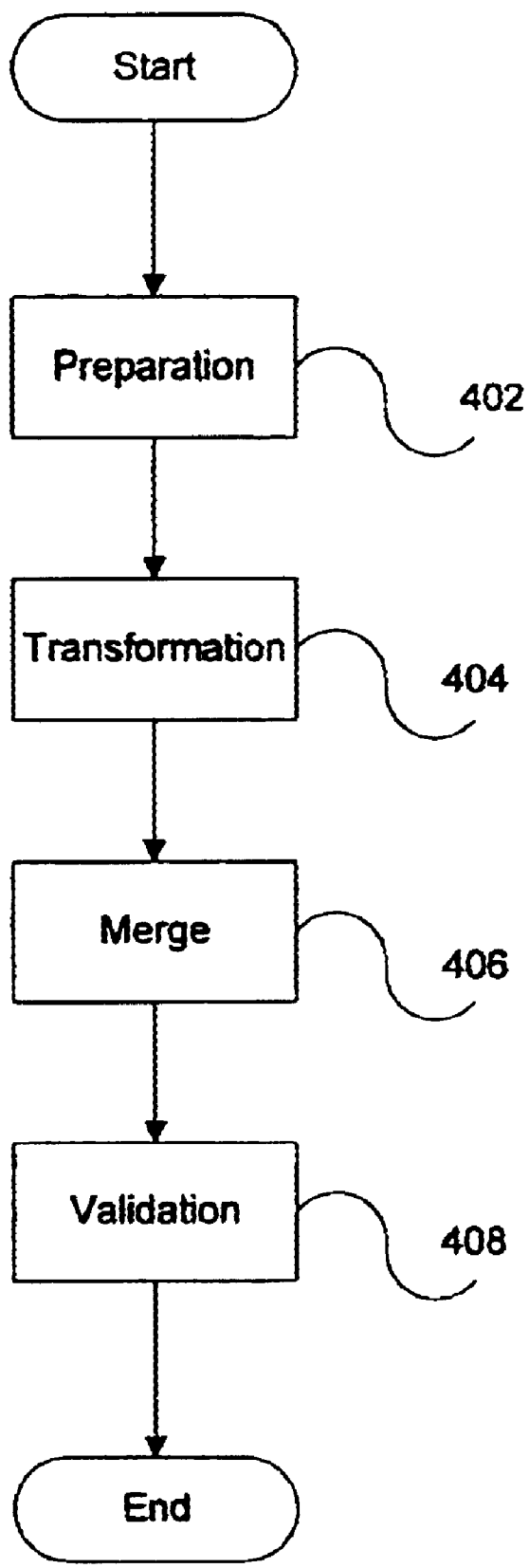
FIG. 4 depicts a high-level process flow chart of an embodiment of the invention.

FIG. 4 depicts a high-level process for performing data consolidation according to an embodiment of the invention. The preparation phase 402 involves analysis of the data and database structures to be consolidated. An objective of the preparation phase is to perform a feasibility analysis—to learn enough about the database structures to compile a consolidation strategy and to compile a set of transformation rules (the client rules). More details regarding the preparation phase are described with respect to FIG. 5A. The transformation phase 404 involves applying the client rules to transform data to be consolidated. More details regarding the transformation stage 404 are described with reference to FIG. 5B. The merge phase 406 involves consolidation of data, which may include transformed data, from multiple MSOBA product installation groups into a single MO product installation group. This stage is described in more detail in FIG. 5C and its accompanying text. The final stage is the validation stage 408, which is described further in the text accompanying FIG. 5D.

Figure 5A:
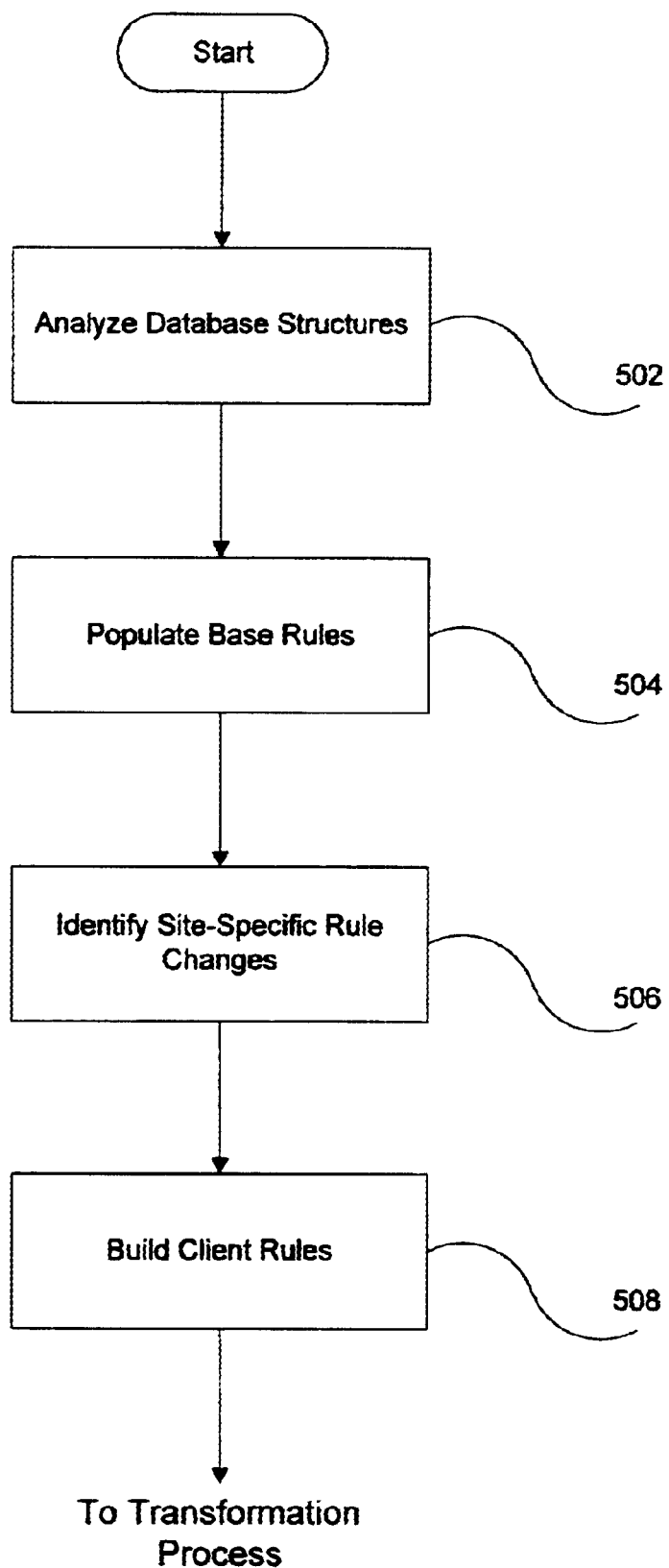
FIG. 5A depicts a process flow chart of a process for preparing a database system for consolidation according to an embodiment of the invention.

FIG. 5A shows a process flow of the preparation phase 402 according to an embodiment of the invention. At step 502, analysis is performed to evaluate internal database structures, to determine the strategy for consolidating the databases and to determine if the standard data model is being used. According to an embodiment, if the standard data model is not being used, then the primary keys and unique keys should be identified for transformation in order to resolve potential conflicts and preserve uniqueness in the resultant product installation group. As part of the analysis, all foreign key relationships with primary/unique keys should be identified. In a relational data management system, a foreign key is a link to a primary key and records the primary key value outside a primary table. Thus to maintain relational integrity, a change to a primary key value requires an associated change to each foreign key. One embodiment of the invention updates foreign key values whenever a primary key value changes. This update can be deferred to process each table separately in a bulk manner.

The present embodiment of the invention assumes that key values are not unique and transforms all primary/unique key values, and consequently, their associated foreign key references. The present invention creates uniqueness at the key level rather than the data level. The present invention can also be used to create uniqueness at the row level.

The analysis may involve a determination of whether the hardware/software configuration of the database system (e.g., disk space and processor speed) is adequate for the consolidation effort. Analysis may also involve a determination of the proper configuration for the MO architecture and to ensure that application set-up and business processes are adapted for the new structure. For example, if each product installation group deals with the same supplier having the same name, there will be a unique constraint violation when merging the records into one product installation group. Based upon the application, if the partitioning of suppliers is at the site level, users will end up with either one supplier and two sites or two unique suppliers and two sites. If the two supplier option is selected, then clerks must have some way of distinguishing between suppliers when recording invoices in the merged database.

An additional analysis step may involve a gap analysis of architecture issues, such as analysis of interfaces, customizations, and third party integrator products. These products, forms, and reports may require modification to work properly in a single product installation group configuration, such as the MO architecture. Context sensitive flexfields (customer configurable application features) where the context may be changed as a result of the transition to a single product installation group may also be analyzed. An extension to the transformation rules may be required in order to properly transform and merge custom data.

Test plans can be prepared to validate new MO functionality and data conversion with particular emphasis on the points of integration between applications. These test plans are utilized in the validation phase 408.

The preliminary analysis process identifies temporary or interface tables with any existing rows to identify any potential transactions requiring resolution. According to an embodiment of the invention, temporary and interface tables should not be transformed or merged. Thus, all items in progress should be completed so that the temporary and interface tables are empty before starting consolidation.

Because of the varying approaches to MSOBA, it may be important to assess the technical environment before beginning the consolidation. Some issues that could affect the consolidation procedure include:

partial instead of full installation or implementation of products;

synonyms referencing a non-primary product installation group from the primary;

configurations which refer multiple product installation groups to a single set of books;

hardware with insufficient capabilities;

custom triggers and hard coded views which may fail as a result of the transformation or merge; and context sensitive flexfields whose context may no longer be valid after a transformation or merge.

Thus, the initial analysis stage involves an analysis of various database, data model, and data related factors, including for example, the following: (a) table free space by schema; (b) table space size and usage by user; (c) rollback segment size; (d) triggers and indexes; (e) segments nearing maximum; (f) invalid objects; (g) synonyms; (h) sequences; and (i) temp and interface tables.

Referring back to FIG. 5A, the next step of the preparation phase 504 is to populate the base transformation rules for standard data models of database application versions involved in the consolidation. FIG. 7 depicts an example of a base rules table 700. In FIG. 7, each row of base rules table 700 corresponds to a separate database table/column that may be transformed in the standard data model. Column 702 in base rule table 700 identifies a database schema (which could be, for example, AP, AP2, AP3, et cetera for objects in Oracle Applications products). Column 704 identifies a specific table, while column 706 identifies a particular column in that table. Column 708 identifies the rule type associated with the column to be transformed. Some transformation rule types that can be employed in the invention include the prefix rule type, sequence rule type, org__id rule type, and pre__c rule type. Further information about these rule types were discussed previously in the text corresponding to FIG. 3. Column 710 is the site specific value that is applied to the existing column contents. Column 710 is normally empty in the base rule table 700, but is filled in at the client rules table 800 (see FIG. 8A).

Referring back to FIG. 5A, the next steps are to identify site-specific rule changes relating to any modifications to the standard data models (506). The client rules are built using the base rules and adding identified site-specific rule changes (508). This allows users to reconcile differences between the standard data model for the database application and any of the user's nonstandard or patched database structures.

FIG. 8A depicts an example of a client rules table 800. This table contains the rules for all product installation groups present in the user database. In the preferred embodiment, the structure of the client rules table 800 is identical to the structure of the base rules table 700. The client rules table 800 includes the base rules table 700 plus any changes, additions, or deletions required by any site-specific rule changes. Part of the process for identifying site-specific rule changes is to identify changes to the standard database schema model. Since the base rules table 700 probably does not include transformation rules for custom tables/columns, a new row is added to the client rules table 800 containing the transformation rule appropriate for that custom structure. Similarly, any non-applicable transformation rules can be removed from the client rules table 800 and default rule types overridden as appropriate.

Note that column 810 is filled in for each row shown in the client rules table 800 of FIG. 8A. During the analysis phase, a determination is made regarding the transformation rule value that should be applied to each database structure to ensure the absence of conflicts for data values that must remain unique. In the example of FIG. 8A, each column in the base schema AR2 having the SEQ rule type has the value "22000000" added to the existing column value to ensure uniqueness.

Figure 8B:
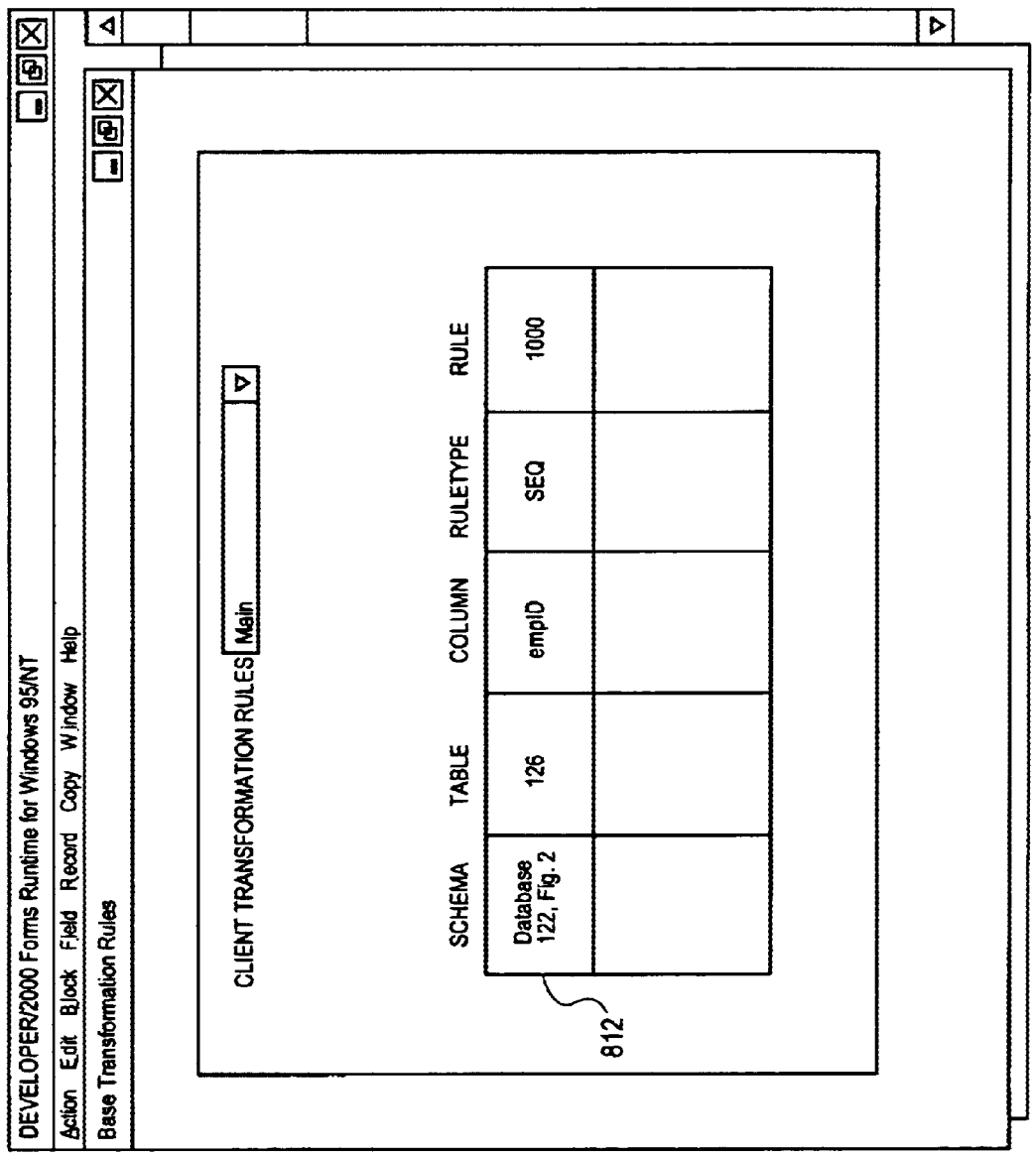

As a further example, FIG. 8B depicts a client rules table directed to the consolidation performed for tables 124 and 126 of FIG. 1. Row 812 of client rules table 814 contains the transformation rule and rule type to transform the EMPID column of table 126 in database 122, such that when merged with table 124, the resulting consolidated table is as shown in FIG. 2.

Figure 9:
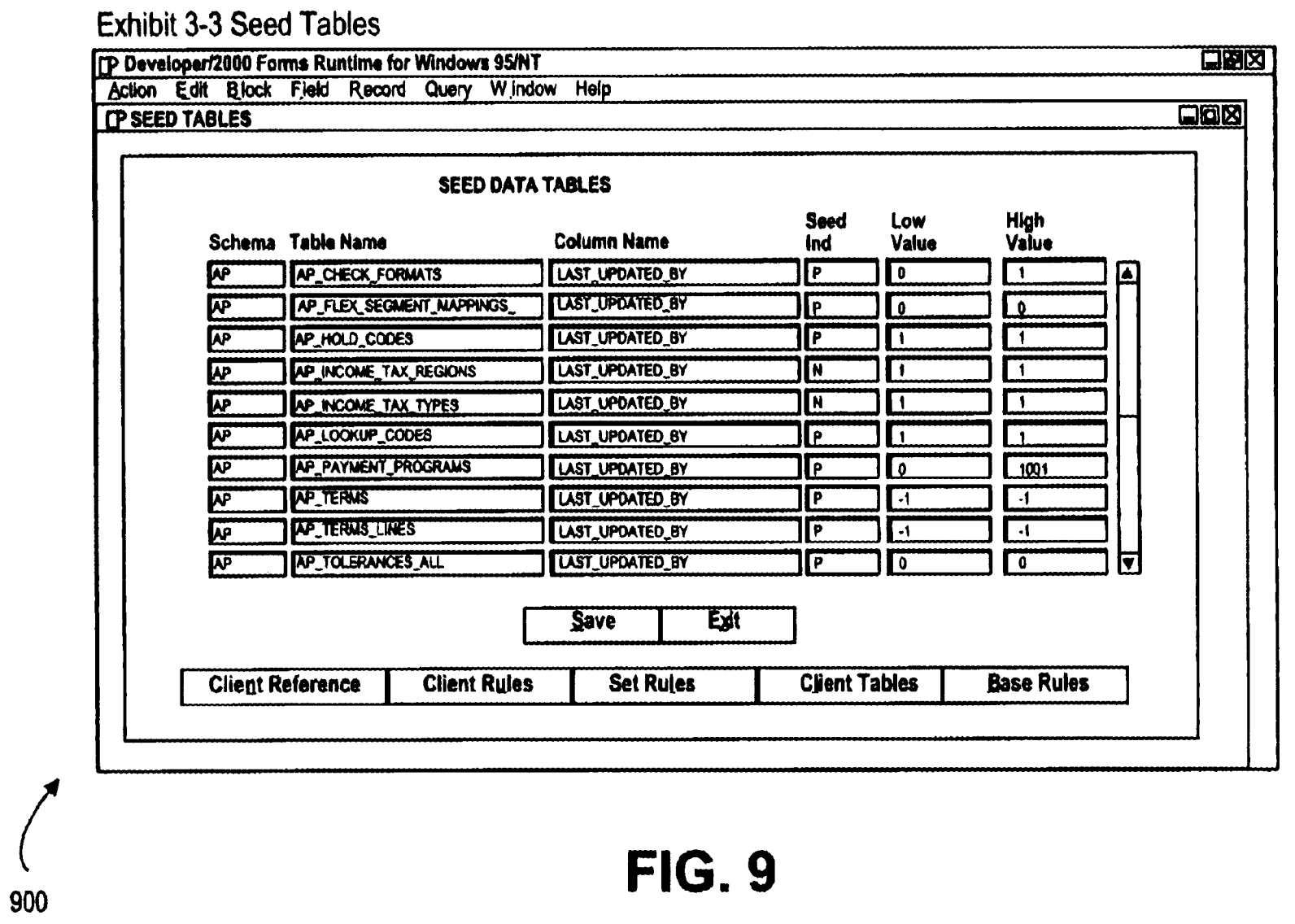

FIG. 9 illustrates an example of a seed table 900 which identifies application tables that store seed and setup data. Some tables contain only seed data and therefore none of the values in the non-primary product installation group should be migrated (no merge). Others are mixed seed and user defined data and only the user defined data in the non-primary product installation group should be migrated (partial merge). The nature and disposition of all seed tables (N-no merge, P-partial merge) are identified in the seed data section of the rules table. The "Low Value" and "High Value" columns specify parameters for values which will not be merged. These high and low values can be overridden by users to suit specific requirements. Upgrades may affect last__updated__by values, thereby impacting the reliability of values used as default no-merge parameters in the seed table. To identify user values that may be defined, seed tables should be reviewed at the data level for any potential values which require exception handling and adjust default values accordingly.

Figure 10:
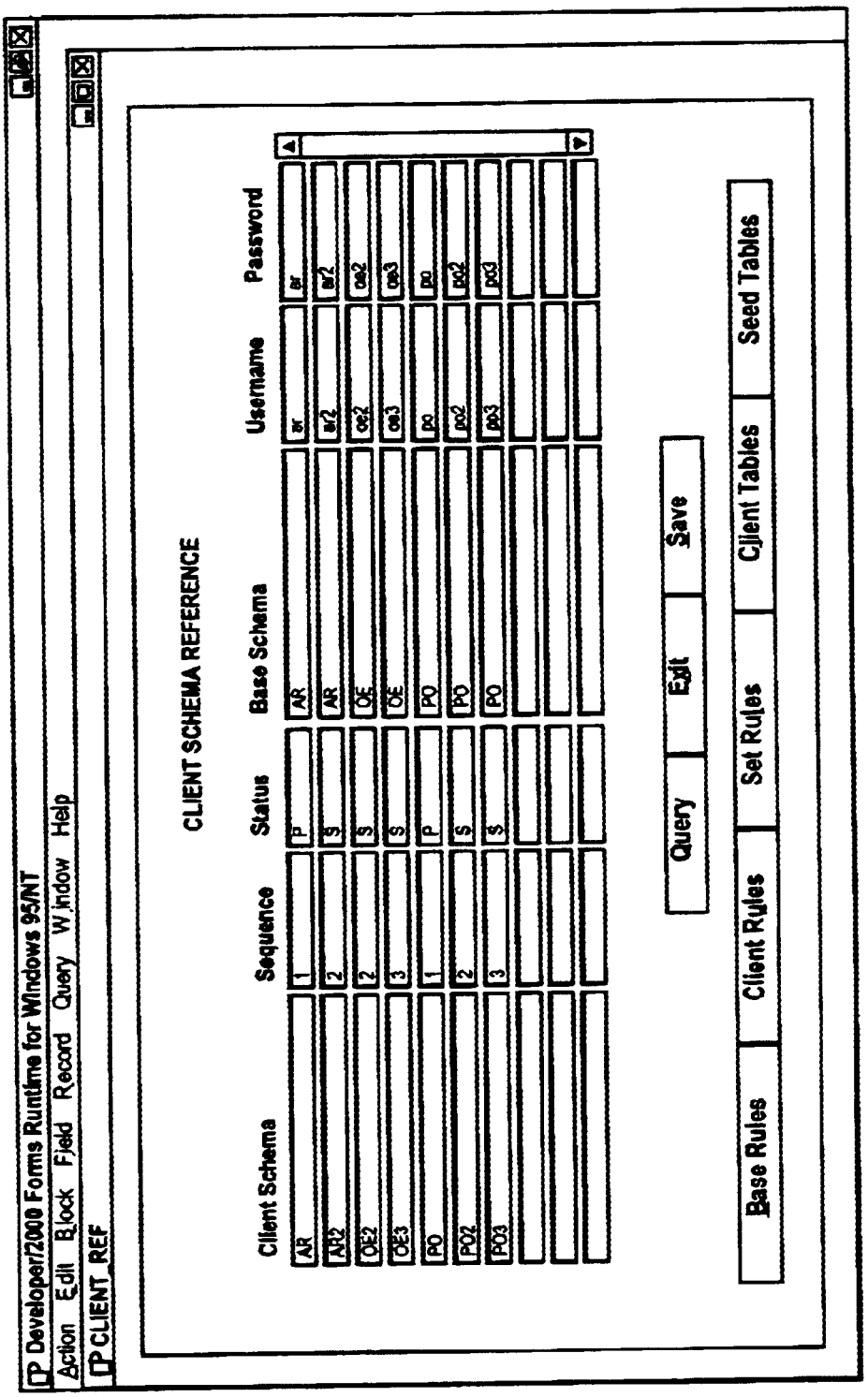
FIG. 10 summarizes the layout of the database to which an embodiment of the invention is applied.

FIG. 10 illustrates a client schema table 1000, which contains a mapping of user database structures and access information. The table also contains the status of the user database structures. The sequence column identifies the product installation group number. The status column indicates whether a schema is part of the source "S" (non-primary product installation groups) or primary "P" (target or primary product installation group).

A non-intrusive transformation can be performed prior to transformation to help identify potential merge/transformation errors. The non-intrusive procedure can be performed by running the transformation in "report mode". Any errors encountered are logged and reflected in an exception report so they can be resolved before transformation begins. This can minimize errors during the actual transformation. Before moving into the transformation phase, a backup should be performed. This backup may be used as the "before" database in the testing cycle.

Figure 5B:
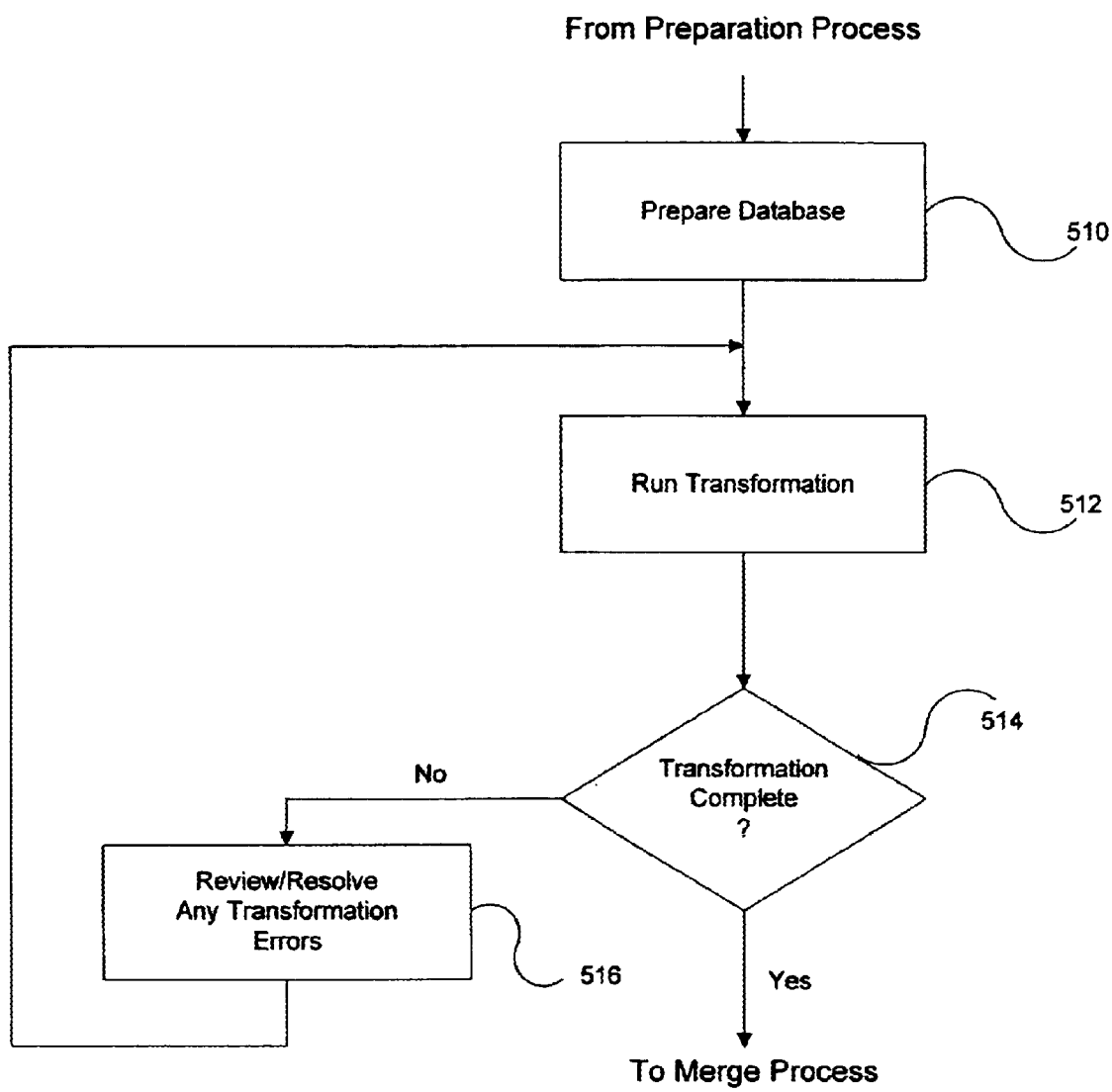
FIG. 5B depicts a process flow chart of a process for transformation according to an embodiment of the invention.

FIG. 5B shows a process flow for the transformation phase 404 according to an embodiment of the invention. An objective of the transformation phase is to make changes to data in the non-primary product installation group to ensure uniqueness.

The initial step of the transformation process 404 is to prepare the database for transformation (510). One preparation action performed in the present embodiment is disabling source (non-primary product installation group) data integrity enforcement constraints, such as but not limited to, database triggers and foreign key constraints, and small rollback segments. Database triggers are stored procedures associated with a particular table and which enforce an exit rule. Triggers cause special processing to occur upon insert/ update/delete operations. Triggers are routinely disabled during maintenance procedures to minimize impact on performance. Since transformation involves update statements, disabling triggers allow for performance improvements during transformation. Foreign key constraints enforce existence of a primary key value. Foreign key constraints are routinely disabled during maintenance operations so that a primary key value may be updated asynchronously from the update of the foreign key value. Disabling small rollback segments help prevent errors. Before disabling triggers, it is advisable to ensure there are no users on the system and that batch or background processes have been shut down.

Another action that can be performed to prepare the database for transformation is dropping indexes in the source (non-primary product installation groups). Indexes are typically columns or combination of columns that uniquely identify a record (other types of indexes also exists, e.g., non-unique indexes). Indexes are typically placed on unique constraints and certain other values. The transformation process preferably maintains a log of what indexes were dropped to facilitate rebuilding of the same indexes before system testing. Dropping indexes may also enhance performance.

The next action in the transformation process is to apply transformation rules to non-primary product installation groups (512). As discussed above, the need for transformation arises if overlapping sequences and primary/unique key conflicts exist between separate product installation groups. These primary/unique key values and their associated foreign keys are transformed to resolve conflicts and preserve uniqueness in a single consolidated product installation group.

Each value requiring transformation appears in the client rules table 800 along with an associated rule type. According to an embodiment, the invention does not analyze at the data level before applying the transformation rules, it simply assumes all values in the column need to be transformed. If none of the records for a table/column needs to be transformed, it is possible to delete the associated transformation rules. An alternate embodiment intelligently analyzes at the data level and selectively applies transformation rules only when required.

If the transformation process completes without error (514), then the process moves to the merge phase. However, if transformation errors have been detected, they should be resolved before the merge phase (516). For example, the wrong transformation rule values could have been chosen, causing overlapping sequences to exist. If this error occurs, the client rules table is modified to ensure that no overlaps occur, and the process will return to step 512 to perform the transformation procedure.

In the preferred embodiment, a transformation log is maintained to capture the progress and status of the transformation process. An internal flag can be used to identify which records have already been processed. Any application or system errors encountered will be reflected in the transformation log. If an error occurs, then internal flags can be used to identify and reprocess only those records which fail. According to an alternate embodiment, the transformation process is an all or nothing proposition. If any records in a table fail the transformation, the entire table will fail and be written to the error log. Users can specify parameters to stop the transformation when errors are encountered in a specified number of tables. Prior performance of the non-intrusive transformation will help minimize the risk of failure at this point. When the process is complete, an end of report message is placed in the log.

To minimize downtime, the transformation process can be performed in parallel. Multiple concurrent transformation processes can be executed in parallel to achieve optimal performance. Parallel processing makes it possible to specify transformation on one or all product installation groups at the same time. If a transformation process is stopped and then resumed, the transformation can be restarted at the point it was paused, eliminating any re-work.

Figure 5C:
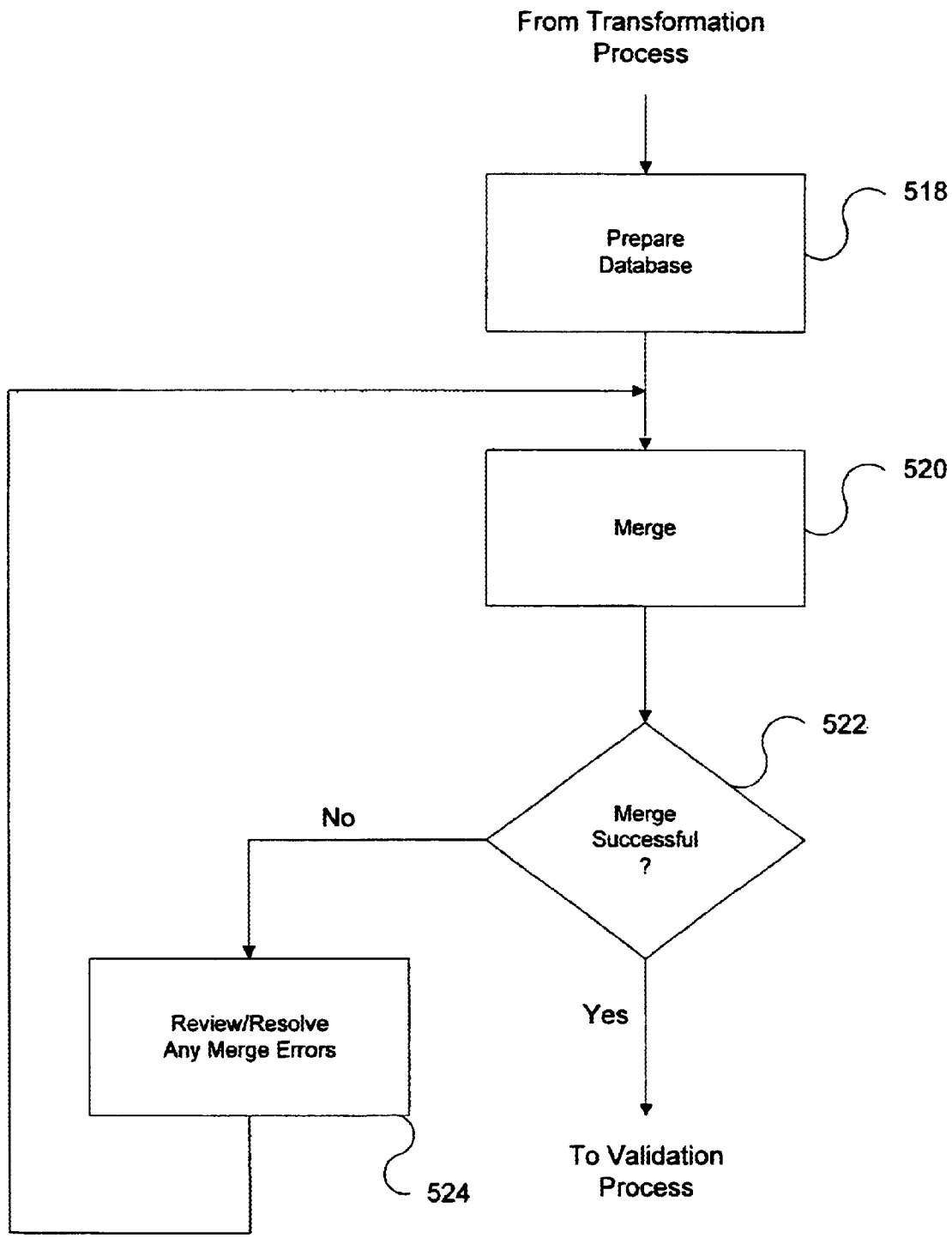
FIG. 5C depicts a process flow chart of a process for merge according to an embodiment of the invention.

FIG. 5C shows a process flow for the merge phase 406 according to an embodiment of the invention. An objective of the merge phase is to move transformed data from the non-primary product installation groups into corresponding tables in the primary product installation group. According to an embodiment, the database should be prepared for merge by disabling data integrity enforcement constraints in the target (primary product installation group), such as database triggers and foreign key constraints, if they were not already disabled during the transformation phase (518). The indexes in the primary product installation group can be dropped (if not already dropped during the transformation phase) to increase performance. According to an embodiment, the primary product installation group is not taken offline until necessary during the merge to maximize system uptime.

At step 520, transformed data from the source (non-primary product installation groups) are merged into the target (primary product installation group). According to an embodiment, there is one commit per table during the merge process.

A merge log can be maintained to capture the progress and status of the merge process. An internal flag can be used to identify which records have been processed. Any application or system errors encountered will be reflected in the merge log. When the process is complete an end of report message is placed in the log. A review of a merge log is performed to determine whether the merge procedure was successful (522). If an error is detected, it should be resolved and the particular merge process re-performed. The internal flag is used to re-process only those records that fail during the prior merge. According to another embodiment, if any of the records in a table fail the merge, the entire table will fail and be written to an error log. Users can specify parameters to stop the merge when errors are encountered in a specified number of tables. Prior execution of the non-intrusive transformation check will help minimize the risk of failure at this point.

To minimize downtime, the merge process can be performed in parallel. Multiple concurrent merge processes can be executed in parallel to achieve optimal performance. Parallel processing makes it possible to specify merge on one or all product installation groups at the same time. If a merge process is stopped and then resumed, the merge procedure can be restarted at the point it was paused, eliminating any rework.

Figure 5D:
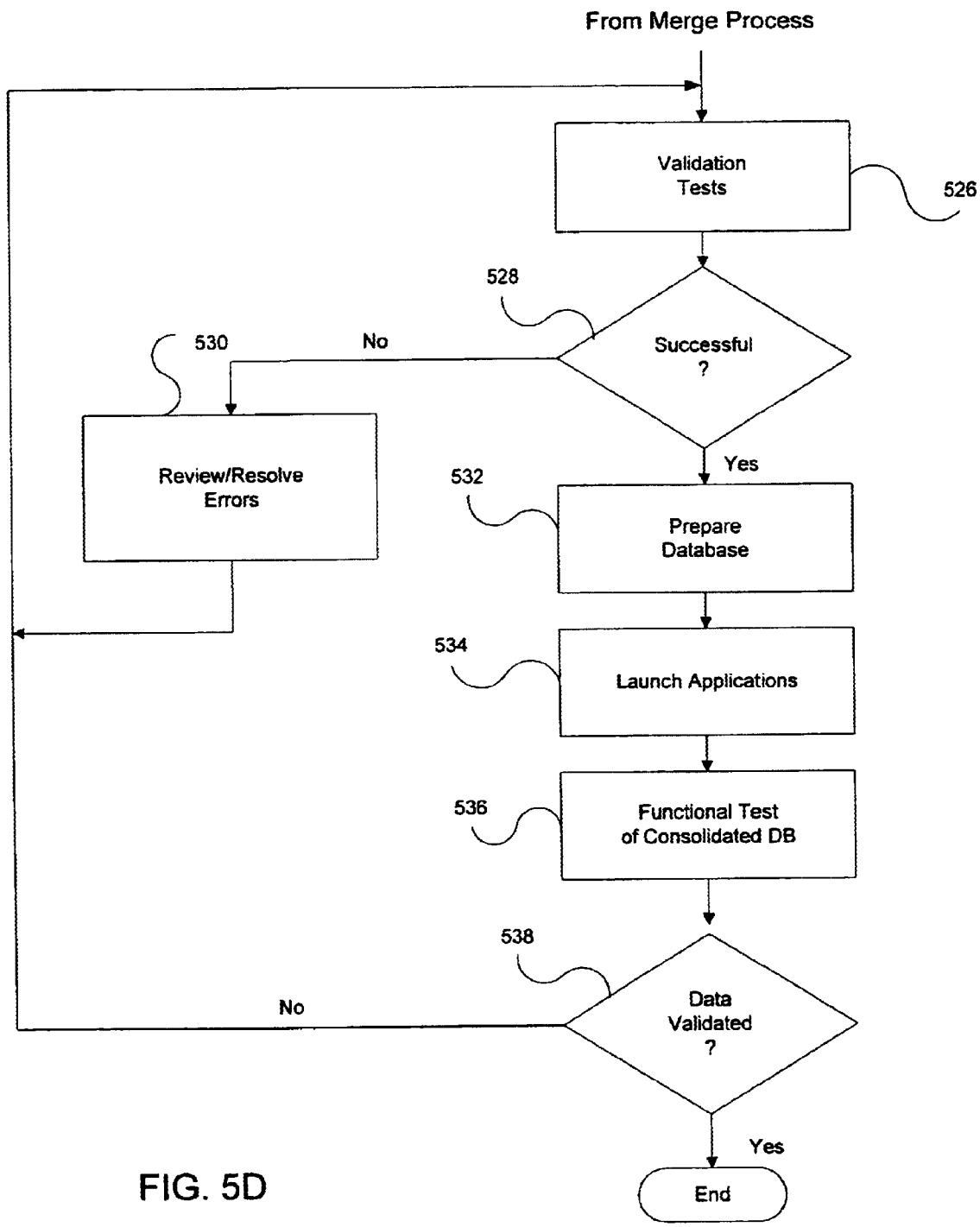
FIG. 5D depicts a process flow chart of a process for validation according to an embodiment of the invention.

FIG. 5D shows a process flow for the validation phase 408 according to an embodiment of the invention. An objective of the validation phase is to validate post migration product functionality and ensure the integrity of consolidated historical data. The initial step of the validation phase 408 is to perform a comparison of the record counts for each table from before and after the transformation/merge processes (526). The purpose of this step is to validate the transformation/merge at the table level. These tests take into account partial and no merge situations applied to temp/interface tables and seed tables. An additional validation step is to determine whether any database objects were invalidated as a result of the transformation/merge. If validation errors are detected (528), any errors must be reviewed and corrected (530) before the transformation/merge processes can be performed. According to an embodiment, if validation errors are detected, then transformation or merge steps can be modified and repeated to address the detected validation errors.

If no validation errors are detected, then the database is prepared for regular operations (532). For example, triggers and foreign key constraints in the target (primary product installation group) are re-enabled, which preferably enables only those triggers and foreign key constraints that have previously been disabled prior to the transformation/merge processes. Re-enabling the triggers and foreign key constraints at this point will help flush out any potential errors so they can be corrected before rebuilding the indexes, thereby minimizing the impact on system down time. If indexes in the target (primary product installation group) have been disabled during the transformation/merge process, then the indexes are also rebuilt.

Thereafter, the database applications can be launched for testing (534). Data integrity and product functionality can now be tested, e.g., using test plans developed during the preparation phase (536). One more validation step may be performed by exporting the production database and comparing it with the final test run (538).

Note that the above illustrative example is specifically directed to migrations of multiple schemas for a product from a MSOB architecture to a single schema for a product in a MO architecture. However, the present invention also applies to consolidating other types of disparate database structures, and is not limited to migrations of MSOB architectures.

SYSTEM ARCHITECTURE OVERVIEW

Figure 11:
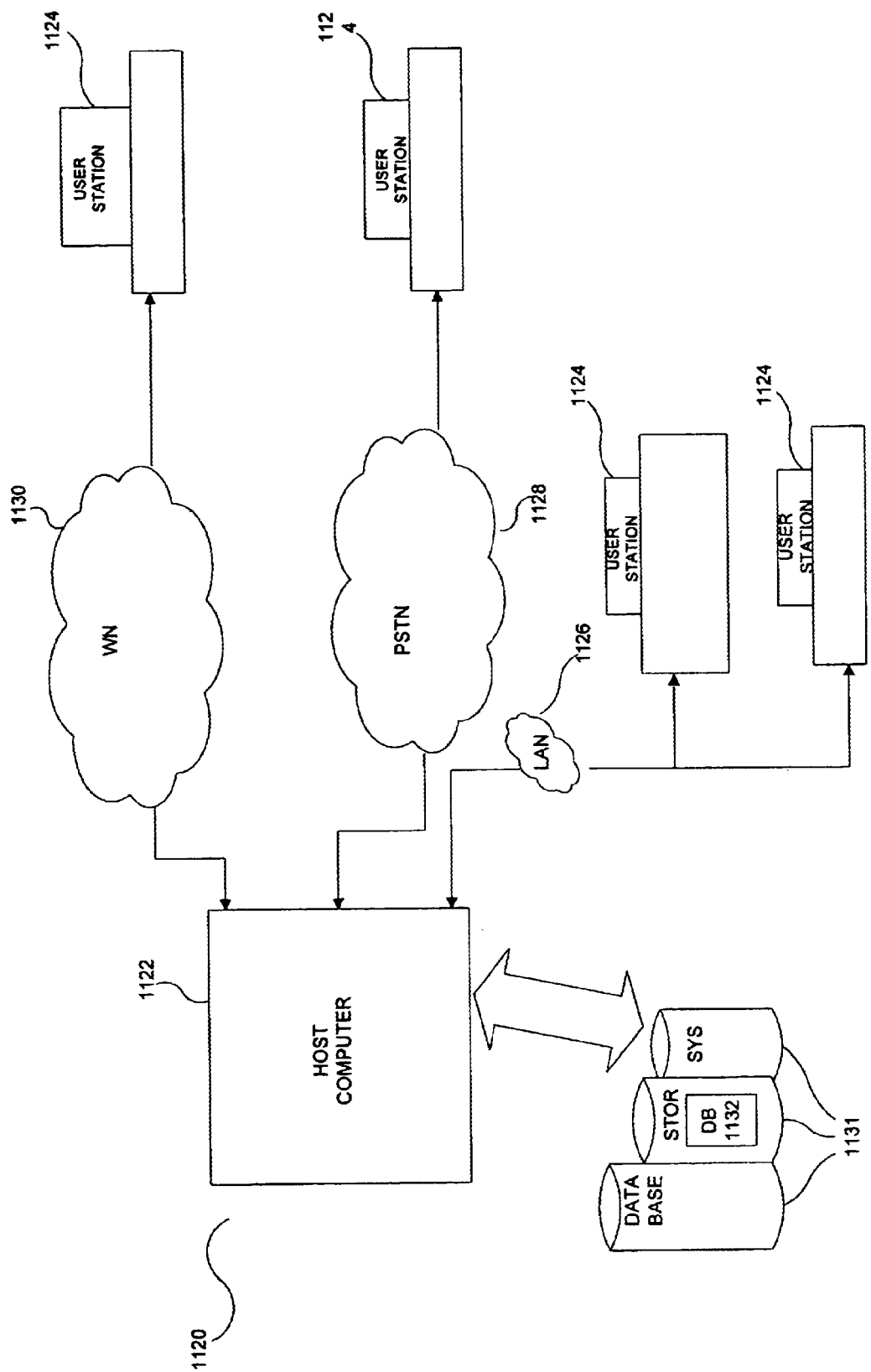
FIG. 11 is a diagram of a computer system with which the present invention can be implemented.

Referring to FIG. 11, in an embodiment, a computer system 1120 includes a host computer 1122 connected to a plurality of individual user stations 1124. In an embodiment, the user stations 1124 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 1124 are connected to the host computer 1122 via a local area network ("LAN") 1126. Other user stations 1124 are remotely connected to the host computer 1122 via a public telephone switched network ("PSTN") 1128 and/or a wireless network 1130.

In an embodiment, the host computer 1122 operates in conjunction with a data storage system 1131, wherein the data storage system 1131 contains a database 1132 that is readily accessible by the host computer 1122. Note that a multiple tier architecture can be employed to connect user stations 1124 to a database 1132, utilizing for example, a middle application tier (not shown).

In alternative embodiments, the database 1132 may be resident on the host computer, stored, e.g., in the host computer's ROM, PROM, EPROM, or any other memory chip, and/or its hard disk. In yet alternative embodiments, the database 1132 may be read by the host computer 1122 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 1122 can access two or more databases 1132, stored in a variety of mediums, as previously discussed.

Figure 12:
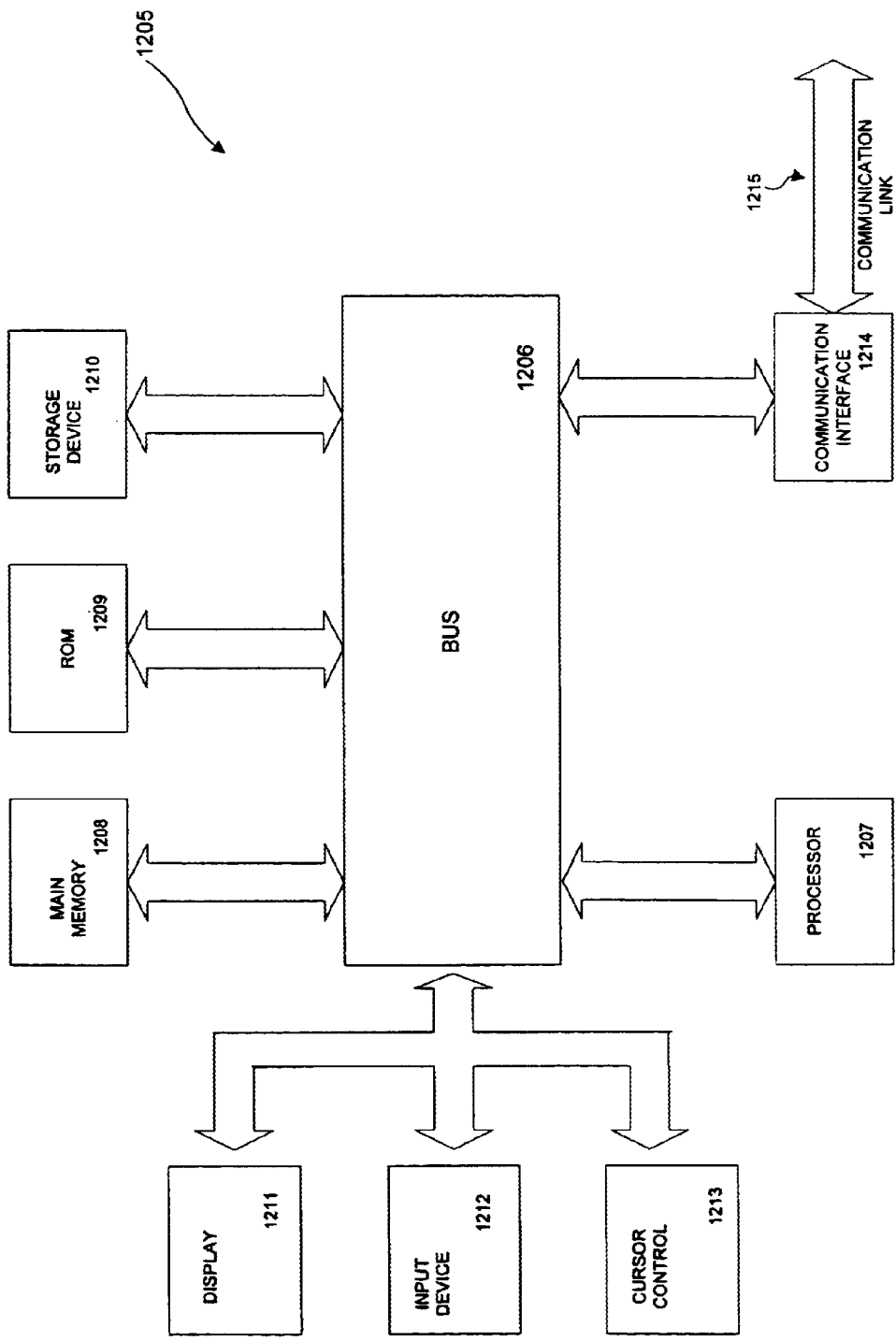
FIG. 12 is an additional diagram of a computer system with which the present invention can be implemented.

Referring to FIG. 12, in an embodiment, each user station 1124 and the host computer 1122, each referred to generally as a processing unit, embodies a general architecture 1205. A processing unit includes a bus 1206 or other communication mechanism for communicating instructions, messages and data, collectively, information, and one or more processors 1207 coupled with the bus 1206 for processing information. A processing unit also includes a main memory 1208, such as a random access memory (RAM) or other dynamic storage device, coupled to the bus 1206 for storing dynamic data and instructions to be executed by the processor(s) 1207. The main memory 1208 also may be used for storing temporary data, i.e., variables, or other intermediate information during execution of instructions by the processor(s) 1207.

A processing unit may further include a read only memory (ROM) 1209 or other static storage device coupled to the bus 1206 for storing static data and instructions for the processor(s) 1207. A storage device 1210, such as a magnetic disk or optical disk, may also be provided and coupled to the bus 1206 for storing data and instructions for the processor(s) 1207.

A processing unit may be coupled via the bus 1206 to a display device 1211, such as, but not limited to, a cathode ray tube (CRT), for displaying information to a user. An input device 1212, including alphanumeric and other keys, is coupled to the bus 1206 for communicating information and command selections to the processor(s) 1207. Another type of user input device may include a cursor control 1213, such as, but not limited to, a mouse, a trackball, a fingerpad, or cursor direction keys, for communicating direction information and command selections to the processor(s) 1207 and for controlling cursor movement on the display 1211.

According to one embodiment of the invention, the individual processing units perform specific operations by their respective processor(s) 1207 executing one or more sequences of one or more instructions contained in the main memory 1208. Such instructions may be read into the main memory 1208 from another computer-usable medium, such as the ROM 1209 or the storage device 1210. Execution of the sequences of instructions contained in the main memory 1208 causes the processor(s) 1207 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1207. Such a medium may take many forms, including, but not limited to, non-volatile, volatile and transmission media. Nonvolatile media, i.e., media that can retain information in the absence of power, includes the ROM 1209. Volatile media, i.e., media that can not retain information in the absence of power, includes the main memory 1208. Transmission media includes coaxial cables, copper wire and fiber optics, including the wires that comprise the bus 1206. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 1207 can retrieve information.

Various forms of computer-usable media may be involved in providing one or more sequences of one or more instructions to the processor(s) 1207 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 1206 may receive the infrared signals and place the instructions therein on the bus 1206. The bus 1206 may carry the instructions to the main memory 1208, from which the processor(s) 1207 thereafter retrieves and executes the instructions. The instructions received by the main memory 1208 may optionally be stored on the storage device 1210, either before or after their execution by the processor(s) 1207.

Each processing unit may also include a communication interface 1214 coupled to the bus 1206. The communication interface 1214 provides two-way communication between the respective user stations 1124 and the host computer 1122. The communication interface 1214 of a respective processing unit transmits and receives electrical, electromagnetic or optical signals that include data streams representing various types of information, including instructions, messages and data.

A communication link 1215 links a respective user station 1124 and a host computer 1122. The communication link 1215 may be a LAN 1126, in which case the communication interface 1214 may be a LAN card. Alternatively, the communication link 1215 may be a PSTN 1128, in which case the communication interface 1214 may be an integrated services digital network (ISDN) card or a modem. Also, as a further alternative, the communication link 1215 may be a wireless network 1130.

A processing unit may transmit and receive messages, data, and instructions, including program, i.e., application, code, through its respective communication link 1215 and communication interface 1214. Received program code may be executed by the respective processor(s) 1207 as it is received, and/or stored in the storage device 1210, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for consolidating data, comprising:

analyzing a first and a second set of data to determine possible consolidation conflict problems if said second set of data is consolidated with said first set of data, wherein said first set of data is contained in a first source and said second set of data is contained in a second source table;

preparing rules for transforming said second set of data to resolve said possible consolidation conflict problems;

transforming said second set of data using said rules to generate a transformed set of data, wherein said act of transforming said second set of data occurs at said second source table; and merging said transformed set of data with said first set of data.

2. The method of claim 1 in which the act of preparing rules comprises:

populating a set of base rules, said set of base rules corresponding to a standard data model for said second set of data; and modifying said set of base rules with rule changes directed to any differences between said standard data model and a site-specific configuration for said second set of data.

3. The method of claim 2 in which said act of modifying said set of base rules comprises removing one or more specific rules from said set of base rules.

4. The method of claim 2 in which said act of modifying said set of base rules comprises adding one or more additional rules, said one or more additional rules relating to data structures not in said standard data model.

5. The method of claim 1 in which said rules comprises a sequence type rule, in which the act of transforming said second set of data comprises modifying numeric sequence data in said second set of data using said sequence type rule.

6. The method of claim 1 in which said rules comprises a prefix type rule, in which said act of transforming said second set of data comprises prefixing information to character-based data in said second set of data using said prefix type rule.

7. The method of claim 1 in which said act of analyzing said first and second sets of data comprises identifying unique constraints that may overlap between said first and second sets of data.

8. The method of claim 7 in which said act of identifying unique constraints comprises identifying primary keys.

9. The method of claim 8 in which said act of identifying unique constraints comprises identifying foreign keys related to said primary keys.

10. The method of claim 1 in which said act of transforming or merging is performed in parallel.

11. The method of claim 1 in which said act of transforming comprises preparing said second set of data for transformation by disabling data integrity enforcement constraints on said second set of data.

12. The method of claim 11 in which said data integrity enforcement constraints are selected from the group consisting of data triggers, foreign key constraints, and primary key constraints.

13. The method of claim 1 in which said act of transforming comprises preparing said second set of data for transformation by dropping indexes on said second set of data.

14. The method of claim 1 further comprising performing a non-intrusive transformation prior to said act of transforming.

15. The method of claim 1 in which said act of merging comprises disabling data integrity enforcement constraints on said first set of data.

16. The method of claim 15 in which said data integrity enforcement constraints are selected from the group consisting of data triggering foreign key constraints, and primary key constraints.

17. The method of claim 1 in which said act of merging comprises dropping indexes on said first set of data.

18. The method of claim 1 further comprising:
validating consolidation of said second set of data with said first set of data.

19. The method of claim 18 in which the act of validating comprises comparing record counts for data tables.

20. The method of claim 19 in which said act of comparing record counts take into account partial and no-merge situations.

21. The method of claim 18 in which the act of validating comprises comparing individual records for said first and said second sets of data.

22. The method of claim 18 in which the act of validating comprises determining whether database objects were invalidated.

23. A computer program product that includes a medium usable by a processor, the medium having stored thereon a sequence of instructions which, when executed by said processor, causes said processor to execute a process for consolidating data, said process comprising:
analyzing a first and a second set of data to determine possible consolidation conflict problems if said second set of data is consolidated with said first set of data, wherein said first set of data is contained in a first source and said second set of data is contained in a second source table;
preparing rules for transforming said second set of data to resolve said possible consolidation conflict problems;
transforming said second set of data using said rules to generate a transformed set of data, wherein said act of transforming said second set of data occurs at said second source table; and
merging said transformed set of data with said first set of data.

24. The computer program product of claim 23 in which the act of preparing rules comprises:
populating a set of base rules, said set of base rules corresponding to a standard data model for said second set of data; and
modifying said set of base rules with rule changes directed to any differences between said standard data model and a site-specific configuration for said second set of data.

25. The computer program product of claim 24 in which said act of modifying said set of base rules comprises removing one or more specific rules from said set of base rules.

26. The computer program product of claim 24 in which said act of modifying said set of base rules comprises adding one or more additional rules, said one or more additional rules relating to data structures not in said standard data model.

27. The computer program product of claim 23 in which said rules comprises a sequence type rule, in which the act of transforming said second set of data comprises modifying numeric sequence data in said second set of data using said sequence type rule.

28. The computer program product of claim 23 in which said rules comprises a prefix type rule, in which said act of transforming said second set of data comprises prefixing information to character-based data in said second set of data using said prefix type rule.

29. The computer program product of claim 23 in which said act of analyzing said first and second sets of data comprises identifying unique constraints that may overlap between said first and second sets of data.

30. The computer program product of claim 29 in which said act of identifying unique constraints comprises identifying primary keys.

31. The computer program product of claim 30 in which said act of identifying unique constraints comprises identifying foreign keys related to said primary keys.

32. The computer program product of claim 23 in which said act of transforming or merging is performed in parallel.

33. The computer program product of claim 23 in which said act of transforming comprises preparing said second set of data for transformation by disabling data integrity enforcement constraints on said second set of data.

34. The computer program product of claim 33 in which said data integrity enforcement constraints are selected from the group consisting of data triggers, foreign key constraints, and primary key constraints.

35. The computer program product of claim 23 in which said act of transforming comprises preparing said second set of data for transformation by dropping indexes on said second set of data.

36. The computer program product of claim 23 further comprising performing a non-intrusive transformation prior to said act of transforming.

37. The computer program product of claim 23 in which said act of merging comprises disabling data integrity enforcement constraints on said first set of data.

38. The computer program product of claim 37 in which said data integrity enforcement constraints are selected from the group consisting of data triggering foreign key constraints, and primary key constraints.

39. The computer program product of claim 23 in which said act of merging comprises dropping indexes on said first set of data.

40. The computer program product of claim 23 further comprising:
validating consolidation of said second set of data with said first set of data.

41. The computer program product of claim 40 in which the act of validating comprises comparing record counts for data tables.

42. The computer program product of claim 41 in which said act of comparing record counts take into account partial and no-merge situations.

43. The computer program product of claim 40 in which the act of validating comprises comparing individual records for said first and said second sets of data.

44. The computer program product of claim 40 in which the act of validating comprises determining whether database objects were invalidated.

45. A non-site-specific method for consolidating data, wherein the method is capable of being configured for a specific site, the method comprising:
automatically analyzing a first and a second set of data to determine possible consolidation conflict problems if said second set of data is consolidated with said first set of data, wherein said first set of data is contained in a first source and said second set of data is contained in a second source table;
preparing rules for transforming said second set of data to resolve said possible consolidation conflict problems;

automatically transforming said second set of data using said rules to generate a transformed set of data, wherein said act of automatically transforming said second set of data occurs at said second source table; and automatically merging said transformed set of data with said first set of data.

46. The method of claim 45 in which the act of preparing rules comprises:

populating a set of base rules, said set of base rules corresponding to a standard data model for said second set of data; and modifying said set of base rules with rule changes directed to any differences between said standard data model and a site-specific configuration for said second set of data.

47. The method of claim 45 in which said act of automatically analyzing said first and second sets of data comprises identifying unique constraints that may overlap between said first and second sets of data.

48. The method of claim 45 in which said act of automatically transforming or merging is performed in parallel.

49. The method of claim 45 in which said act of automatically transforming comprises preparing said second set of data for transformation by disabling data integrity enforcement constraints on said second set of data.

50. The method of claim 45 in which said act of automatically transforming comprises preparing said second set of data for transformation by dropping indexes on said second set of data.

51. The method of claim 45 further comprising performing a non-intrusive transformation prior to said act of automatically transforming.

52. The method of claim 45 in which said act of automatically merging comprises disabling data integrity enforcement constraints on said first set of data.

53. The method of claim 45 in which said act of automatically merging comprises dropping indexes on said first set of data.

54. The method of claim 45 further comprising:

validating consolidation of said second set of data with said first set of data.

55. The method of claim 54 in which the act of validating comprises comparing individual records for said first and said second sets of data.

56. The method of claim 54 in which the act of validating comprises determining whether database objects were invalidated.

57. A computer program product that includes a medium usable by a processor, the medium having stored thereon a sequence of instructions which, when executed by said processor, causes said processor to execute a non-site-specific process for consolidating data, wherein the process is capable of being configured for a specific site, the process comprising:

automatically analyzing a first and a second set of data to determine possible consolidation conflict problems if said second set of data is consolidated with said first set of data, wherein said first set of data is contained in a first source and said second set of data is contained in a second source table;

preparing rules for transforming said second set of data to resolve said possible consolidation conflict problems;

automatically transforming said second set of data using said rules to generate a transformed set of data, wherein said act of automatically transforming said second set of data occurs at said second source table; and automatically merging said transformed set of data with said first set of data.

58. The computer program product of claim 57 in which the act of preparing rules comprises:

populating a set of base rules, said set of base rules corresponding to a standard data model for said second set of data; and modifying said set of base rules with rule changes directed to any differences between said standard data model and a site-specific configuration for said second set of data.

59. The computer program product of claim 57 in which said act of automatically analyzing said first and second sets of data comprises identifying unique constraints that may overlap between said first and second sets of data.

60. The computer program product of claim 57 in which said act of automatically transforming or merging is performed in parallel.

61. The computer program product of claim 57 in which said act of automatically transforming comprises preparing said second set of data for transformation by disabling data integrity enforcement constraints on said second set of data.

62. The computer program product of claim 57 in which said act of automatically transforming comprises preparing said second set of data for transformation by dropping indexes on said second set of data.

63. The computer program product of claim 57 further comprising performing a nonintrusive transformation prior to said act of automatically transforming.

64. The computer program product of claim 57 in which said act of automatically merging comprises disabling data integrity enforcement constraints on said first set of data.

65. The computer program product of claim 57 in which said act of automatically merging comprises dropping indexes on said first set of data.

66. The computer program product of claim 57 further comprising:

validating consolidation of said second set of data with said first set of data.

67. The computer program product of claim 66 in which the act of validating comprises comparing individual records for said first and said second sets of data.

68. The computer program product of claim 66 in which the act of validating comprises determining whether database objects were invalidated.

* * * * *